United States Patent
Bokarev et al.

(10) Patent No.: US 10,890,065 B2
(45) Date of Patent: Jan. 12, 2021

(54) WELL INFILTRATION AREA CALCULATION USING LOGGING WHILE DRILLING DATA

(71) Applicant: Schlumberger Technology Corporation, Sugar Land, TX (US)

(72) Inventors: Anton Bokarev, Tyumen (RU); Airat Ismagilov, Yuzno-Sakhalinsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 348 days.

(21) Appl. No.: 15/696,074

(22) Filed: Sep. 5, 2017

(65) Prior Publication Data

US 2018/0073357 A1    Mar. 15, 2018

(30) Foreign Application Priority Data

Sep. 12, 2016    (WO) ................ PCT/RU2016/000622

(51) Int. Cl.
| | |
|---|---|
| G01V 1/40 | (2006.01) |
| G01V 3/18 | (2006.01) |
| G01V 5/04 | (2006.01) |
| E21B 49/00 | (2006.01) |
| G01V 3/20 | (2006.01) |
| E21B 47/002 | (2012.01) |
| G01V 5/12 | (2006.01) |

(52) U.S. Cl.
CPC ............ *E21B 49/00* (2013.01); *E21B 47/002* (2020.05); *G01V 3/20* (2013.01); *G01V 5/12* (2013.01)

(58) Field of Classification Search
CPC ........ E21B 49/00; E21B 47/0002; G01V 5/12
USPC .......................................................... 702/11
See application file for complete search history.

(56) References Cited

U.S. PATENT DOCUMENTS

| | | | |
|---|---|---|---|
| 4,109,522 A | 8/1978 | Thompson | |
| 6,023,168 A | 2/2000 | Minerbo | |
| 6,167,348 A | 12/2000 | Cannon | |
| 6,671,623 B1 | 12/2003 | Li | |
| 7,581,647 B2 | 9/2009 | Grichar et al. | |
| 7,909,170 B2 | 3/2011 | Jones et al. | |
| 8,287,419 B2 | 10/2012 | Chang | |
| 2003/0089495 A1* | 5/2003 | Bixenman | E21B 43/086 166/265 |
| 2005/0182566 A1* | 8/2005 | DiFoggio | E21B 47/10 702/11 |
| 2011/0114542 A1 | 5/2011 | Carr et al. | |
| 2011/0180107 A1 | 7/2011 | Dahl | |
| 2015/0186567 A1 | 7/2015 | Wu | |
| 2015/0218911 A1* | 8/2015 | Abramova | E21B 37/00 166/177.1 |

(Continued)

OTHER PUBLICATIONS

English Abstract of RU2608838. (Year: 2017).*

(Continued)

*Primary Examiner* — Michael P Nghiem (57) ABSTRACT

A set of directional measurements are obtained for multiple measured depth intervals along the length of a wellbore. Based on the directional measurement sets, and for each measurement set, the locations corresponding to a portion of the well exposed to the reservoir rock are selected. The filtration area of the reservoir formation is calculated based on the selected locations in each measured depth interval. The filtration area is presented for display and analysis.

22 Claims, 8 Drawing Sheets

(56) References Cited

U.S. PATENT DOCUMENTS

2015/0292324 A1* 10/2015 Jackson .................. E21B 49/08
                                                        166/250.01
2019/0112898 A1*  4/2019 Farakhova .......... E21B 41/0092
2019/0242233 A1*  8/2019 Le Calvez .............. E21B 41/00

OTHER PUBLICATIONS

International Search Report and Written Opinion for the equivalent International patent application PCT/US2014/042501 dated Nov. 4, 2014.

International Preliminary Report on Patentability for the equivalent International patent application PCT/US2014/042501 dated Dec. 23, 2015.

Office Action for the equivalent Chinese patent application 201480031049.1 dated Feb. 4, 2017.

International Search Report and Written Opinion for the priority International patent application PCT/RU2016/000622 dated May 15, 2017.

* cited by examiner

WELL INFILTRATION AREA CALCULATION USING LOGGING WHILE DRILLING DATA

CROSS REFERENCE TO RELATED APPLICATIONS

This application claims the benefit of priority to International Patent Application PCT/RU2016/000622, filed on Sep. 12, 2016, the entire content of which is incorporated herein by reference.

BACKGROUND

Extracting fluid hydrocarbons from the subsurface involves the ability to predict the location and size of the area in the subsurface where the fluid hydrocarbons can flow into the wells. Reservoir production of fluid hydrocarbons from a wellbore depends on the size of the contact area between the reservoir formation and the trajectory of the wellbore. If the well is drilled near parallel to the formation dip angle of a laminated formation, the wellbore may cross the formation boundary over a long section of the wellbore length. The reservoir production estimation methods assume the hydrocarbon flow over the entire circumference of the well within the reservoir interval.

SUMMARY

In general, in one aspect, embodiments are directed to map the filtration area of a reservoir formation around a wellbore. A set of directional measurements are obtained for multiple measured depth intervals along the length of a wellbore. Based on the directional measurement set, the locations corresponding to a portion of the well exposed to the reservoir rock are selected. The filtration area of the reservoir formation is calculated based on the selected locations in each measured depth interval. The filtration area is presented.

Other aspects of the technology will be apparent from the following description and the appended claims.

BRIEF DESCRIPTION OF DRAWINGS

FIGS. 3, 4.1, and 4.2 show flowcharts in accordance with one or more embodiments.

FIGS. 5.1, 5.2, 6, 7, 8 show examples in accordance with one or more embodiments.

FIG. 9.1 shows computing system in accordance with one or more embodiments.

FIG. 9.2 shows a network system in accordance with one or more embodiments.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to a method and system for estimating the filtration area of a reservoir penetrated by a well in order to estimate the production of fluid hydrocarbons from the well. In one or more embodiments, the reservoir may be part of a laminated geological layer, where different formation layers are crossed by wellbore. For example, the reservoir formation layer may be a sandstone formation that has oil and gas which is bounded by formation layers of non-reservoir rocks like shale. If wellbore is drilled parallel or at an angle less than vertical, the boundary between reservoir layer and non-reservoir layer is crossed by the wellbore along certain distance where wellbore is placed in between two different geologic layers. In such a scenario the well total filtration area represents a fraction of the total area of the wellbore. One or more embodiments may be applied to calculate the well total filtration area and azimuthal reservoir net-to-gross coefficient based on logging data analysis.

Figure 1:
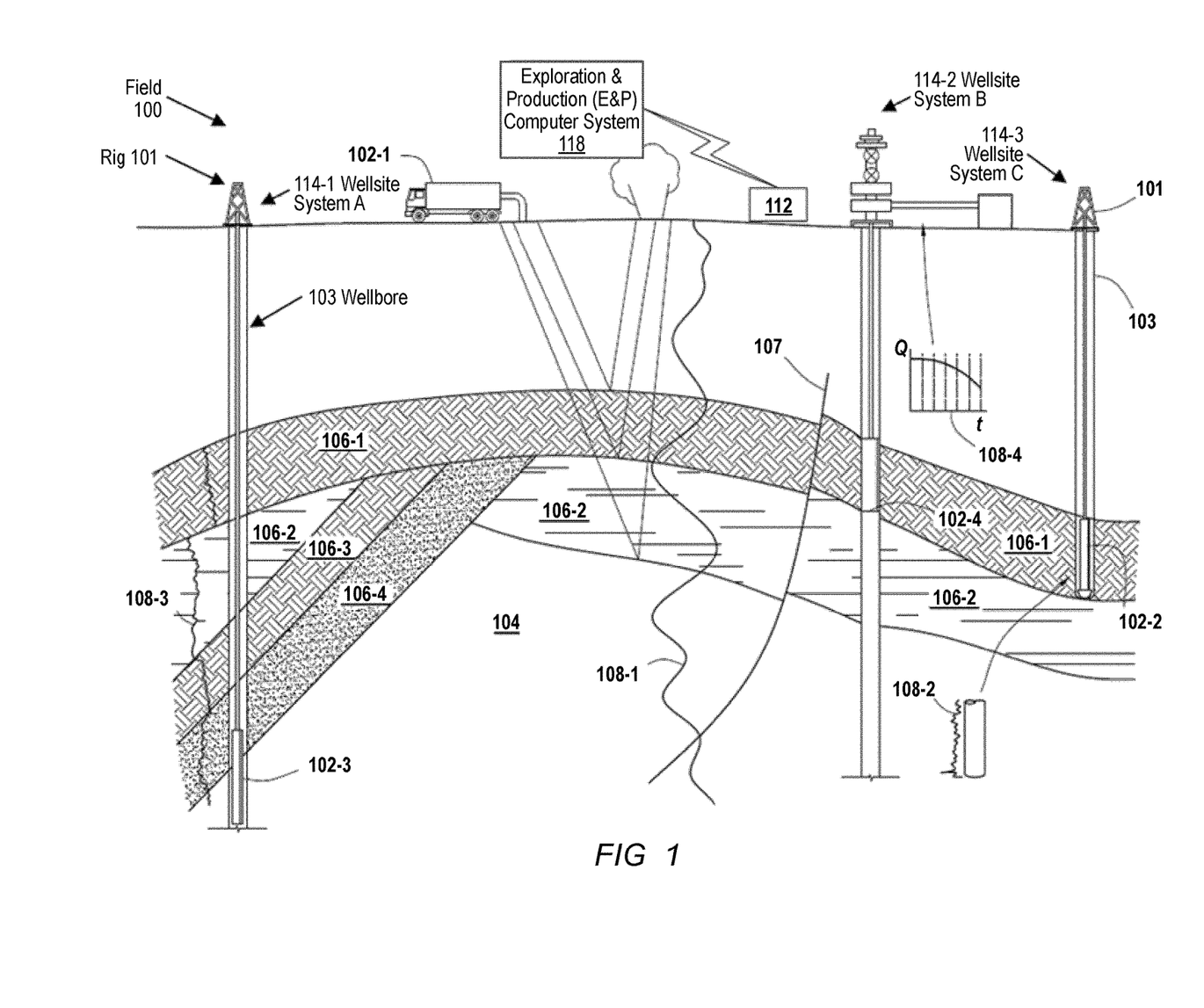
FIG. 1 is a schematic view, partially in cross-section, of a field in which one or more embodiments of well infiltration area calculation using logging while drilling may be implemented.

FIG. 1 depicts a schematic view, partially in cross section, of a field (100) in which one or more embodiments may be implemented. In one or more embodiments, one or more of the modules and elements shown in FIG. 1 may be omitted, repeated, and/or substituted. Accordingly, embodiments should not be considered limited to the specific arrangements of modules shown in FIG. 1.

A geologic sedimentary basin contains subterranean formations (104). As shown in FIG. 1, the subterranean formation (104) may include several geological structures (106-1 through 106-4). As shown, the formation may include a shale layer (106-1), a limestone layer (106-2), a sandstone layer (106-3), and another shale layer (106-4). A fault plane (107) may extend through the formation. In particular, the geologic sedimentary basin includes rock formations and at least one reservoir including fluids. In one or more embodiments, the rock formations include at least one seal rock, for example, the shale layer (106-1), which may act as a top seal. In one or more embodiments, the rock formations may include at least one seal rock, for example, the shale layer (106-4), which may act as a bottom seal. In one or more embodiments, various survey tools and/or data acquisition tools are adapted to measure the formation and detect the characteristics of the geological structures of the formation. Generally, survey operations and wellbore operations are referred to as field operations of the field (100). These field operations may be performed as directed by the surface unit (112).

Figure 91:
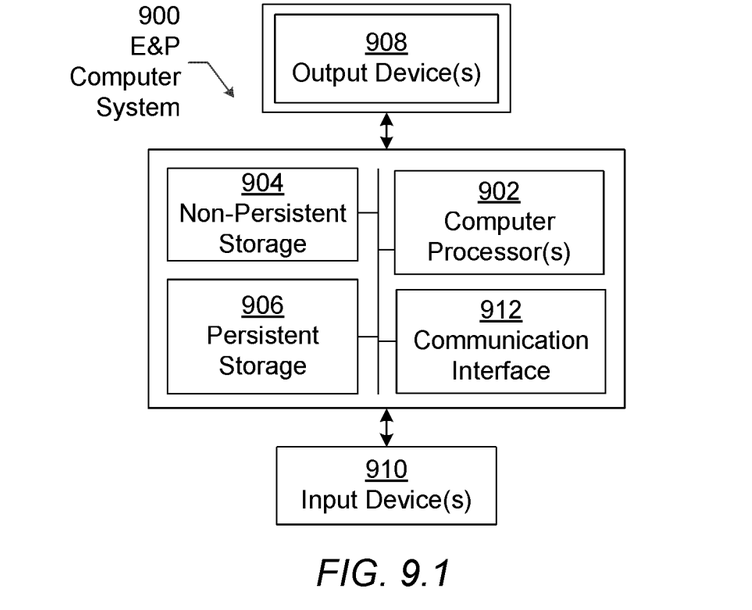
Figure 92:
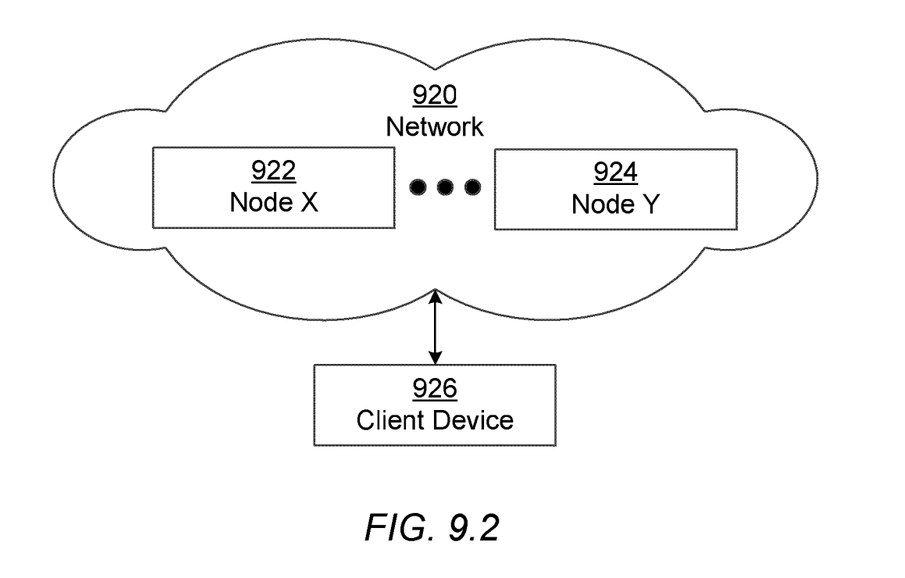

In one or more embodiments, the surface unit (112) is communicatively coupled to the exploration and production (E&P) computer system (118). The E&P computer system may be the computer system described in FIGS. 9.1 and 9.2.

In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as performing simulation, planning, and optimization of production operations of the wellsite system A (114-1), wellsite system B (114-2), and/or wellsite system C (114-3). In one or more embodiments, the result generated by the E&P computer system (118) may be displayed for an analyst user to view the result in a 2D display, 3D display, or other suitable displays. Although the surface unit (112) is shown as separate from the E&P computer system (118) in FIG. 1, in other examples, the surface unit (112) and the E&P computer system (118) may also be combined.

Although FIG. 1 shows a field (100) on the land, the field (100) may be an offshore field. In such a scenario, the subterranean formation may be in the sea floor. Further, field data may be gathered from the field (100) that is an offshore field using a variety of offshore techniques for gathering field data.

In one or more embodiments, the data received by the surface unit (112) represents characteristics of the subterranean formation (104) and may include seismic data and/or information related to location of the horizon and fault surfaces or characteristics of the formation rocks like porosity, saturation, permeability, natural fractures, stress magnitude and orientations, elastic properties, etc., during a drilling, fracturing, logging, or production operation of the wellbore (103) at the wellsite system (110).

Figure 2:
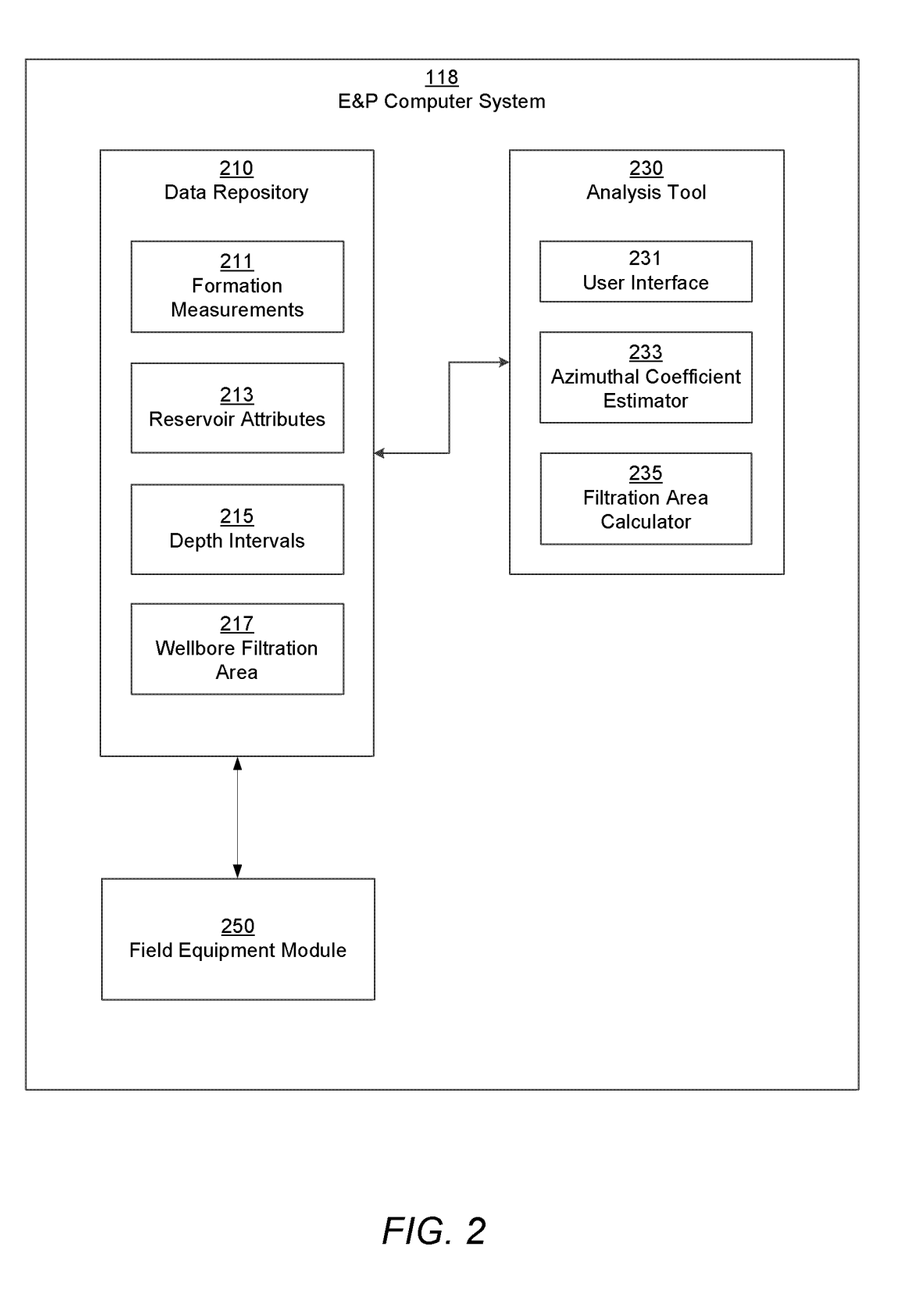
FIG. 2 shows a diagram of a system in accordance with one or more embodiments.

FIG. 2 shows more details of the E&P computer system (118) in which one or more embodiments of the technology may be implemented. In one or more embodiments, one or more of the modules and elements shown in FIG. 2 may be omitted, repeated, and/or substituted. Accordingly, embodiments of evaluation of fluid transport properties in heterogeneous geological formation should not be considered limited to the specific arrangements of modules shown in FIG. 2.

As shown in FIG. 2, the E&P computer system (118) includes a data repository (210) for storing input data, intermediate data, and resultant outputs of the analysis data, an analysis tool (230), and a field equipment module (250) for performing various tasks of the field operation. In one or more embodiments, the data repository (210) may include one or more disk drive storage devices, one or more semiconductor storage devices, other suitable computer data storage devices, or combinations thereof. In one or more embodiments, content stored in the data repository (210) may be stored as a data file, a linked list, a data sequence, a database, a graphical representation, any other suitable data structure, or combinations thereof.

In one or more embodiments, the content stored in the data repository (210) includes formation measurements (211), reservoir attributes (213), depth intervals (215), and wellbore filtration area (217). Each of these components is discussed below.

The formation measurements (211) are defined as a record of a formation rock property along the length of the wellbore. In other words, the formation measurements (211) stores values for one or more properties of the wellbore and subterranean formation around the wellbore. Each value in the formation measurements (211) is defined relative to the path distance to the top of the wellbore, rather than relative to the surface of the earth. The path distance may be referred to as Measured Depth (MD). For horizontal wells, the MD distance may be transformed to distance to the surface called True Vertical Depth Sub Sea (TVDSS) and the horizontal distance from the top of the wellbore called True Horizontal Length (THL). Other measurements of distance may be used without departing from the scope of one or more embodiments. In one or more embodiments, the formation measurements (211) may be obtained from well logging tools (102-3). In one or more embodiments, the formation measurements (211) may be from logging while drilling tools. For example, formation measurements may represent a logging while drilling bulk density image, a formation resistivity log, or a gamma ray log.

In one or more embodiments, the formation measurements (211) may be deemed to have multiple points for the same MD. In other words, at each depth, a number of formation measurements acquired at multiple points on the circumference of the wellbore exist, each point of a formation measurement (211) at the same MD corresponds to a distinct and unique position on the circumference of the wellbore. Thus, each point has a corresponding depth and position values pair, whereby the depth and position may be expressly or implicitly defined. For example, a depth may be expressly defined by including, in the formation measurement, a numeric value that defines the depth (MD) and the position by the radial location of the point (Angle). By way of a second example, a position may be implicitly defined if the position may be inferred based on the location of the value or values within the formation measurements (211). In one or more embodiments, the position may be expressed by the location of the sector where the measurement was acquired. In one or more embodiments, the sectors are defined as a portion of the wellbore section bounded by two successive radial measurements. For example, the wellbore section may be split in a number of sectors of equal span angle. A point may have multiple corresponding values when the values of multiple properties are acquired for the same position and stored in the formation measurements (211).

The reservoir attribute (213) is an attribute of the reservoir. In other words, the reservoir attribute is defined as a formation rock property that can enable identification of a portion of the formation posing reservoir characteristics. A formation is defined as posing reservoir characteristics if the formation allows fluid hydrocarbons to flow and accumulate through the formation pores in quantities sufficient to enable economic activity on accumulated hydrocarbons. A reservoir attribute value, or value of the reservoir attribute, may be derived from one or more formation measurements.

The depth intervals (215) are defined as portions of the wellbore that contain formation measurements within a defined wellbore length span. In one or more embodiments, the depth intervals (215) may be defined by the resolution of the formation measuring tools. In one or more embodiments, a set of formation measurements may be assigned a unique depth when formation measurements are acquired within the same depth interval. For the formation measurements acquired within the same depth interval, the measurements are distinguished by their position around the borehole.

The wellbore filtration area (217) is defined as the surface of the wellbore that is in contact with the portion of the geologic formation identified as a reservoir. In other words, the wellbore filtration area (217) is the area of the wellbore where fluid hydrocarbons flow into the wellbore during production of the well. In wells having a long transition between reservoir and non-reservoir rock, the wellbore filtration area accounts for the fact that a portion of the circumference of the well at multiple depth intervals is exposed to the reservoir rock. The remaining unexposed portion is not part of the wellbore filtration area.

Continuing with FIG. 2, the E&P computer system (118) additionally includes an analysis tool (230) in accordance with one or more embodiments. The analysis tool (230) includes a user interface (231), an azimuthal coefficient estimator (233), and a filtration area calculator (235). Each of these components is described below.

In one or more embodiments, the user interface (231) corresponds to a graphical user interface that includes functionality to receive input from a user and present or display graphical data to the user. The user interface (231) includes a well log viewer, a wellbore image strip viewer, and input fields in accordance with one or more embodiments. The well log viewer is configured to display a plot of the log data in the well log along a straight line in accordance with one or more embodiments. The log view shows the log data with one axis being path distance and the other axis representing value of a formation measurement. The wellbore image strip viewer is configured to display a pictorial representation of the log data or reservoir attribute data that follows a path of the trajectory of the wellbore. In one or more embodiments, the wellbore image strip viewer shows a map of the well log data or reservoir attribute data around the wellbore along the trajectory of the wellbore. The input fields include functionality to receive input parameters from a user. For example, the input parameters may include a threshold value for defining a reservoir attribute, a depth interval to define the resolution of filtration area calculations, and a color palette to map the reservoir filtration area. In one or more embodiments, the input fields may include selection boxes, text fields, drop-down menus, or any other type of field for a user to input data.

Although the user interface (231) is described with respect to the wellbore data, the user interface (231) may include additional user interface components for oilfield analysis. For example, the user interface (231) may include components for simulation and modeling operations, components for interacting with the oilfield, including sending commands to the oilfield, and other components that are not shown or expressly described above.

The digital azimuthal coefficient estimator (233) is a software component that is configured to determine the portion of a depth interval that is part of the wellbore filtration area (217). In one or more embodiments, the digital azimuthal coefficient estimator (233) defines the portion of a depth interval that is part of the wellbore filtration area (217) as a ratio of area that is interfaced to the reservoir formation to the total area of the depth interval.

The filtration area calculator (235) is a software component that is configured to integrate the filtration area coefficients along the entirety of the wellbore and calculate the wellbore filtration area.

In one or more embodiments, the E&P computer system (118) includes the field equipment module (250) that is configured to generate a field operation control signal based at least on a result generated by the E&P computer system (118), such as based on the likelihood of unreliable subsurface information due to a bull-eyes effect in some regions of the field (100) depicted in FIG. 1 above. As noted above, the field operation equipment depicted in FIG. 1 may be controlled by the field operation control signal. For example, the field operation control signal may be used to control drilling equipment, an actuator, a fluid valve, or other electrical and/or mechanical devices disposed about the field (100). In one or more embodiments, field equipment module (250) is configured to acquire a set of data from the field regarding one or more properties of the subsurface formations.

Figure 3:
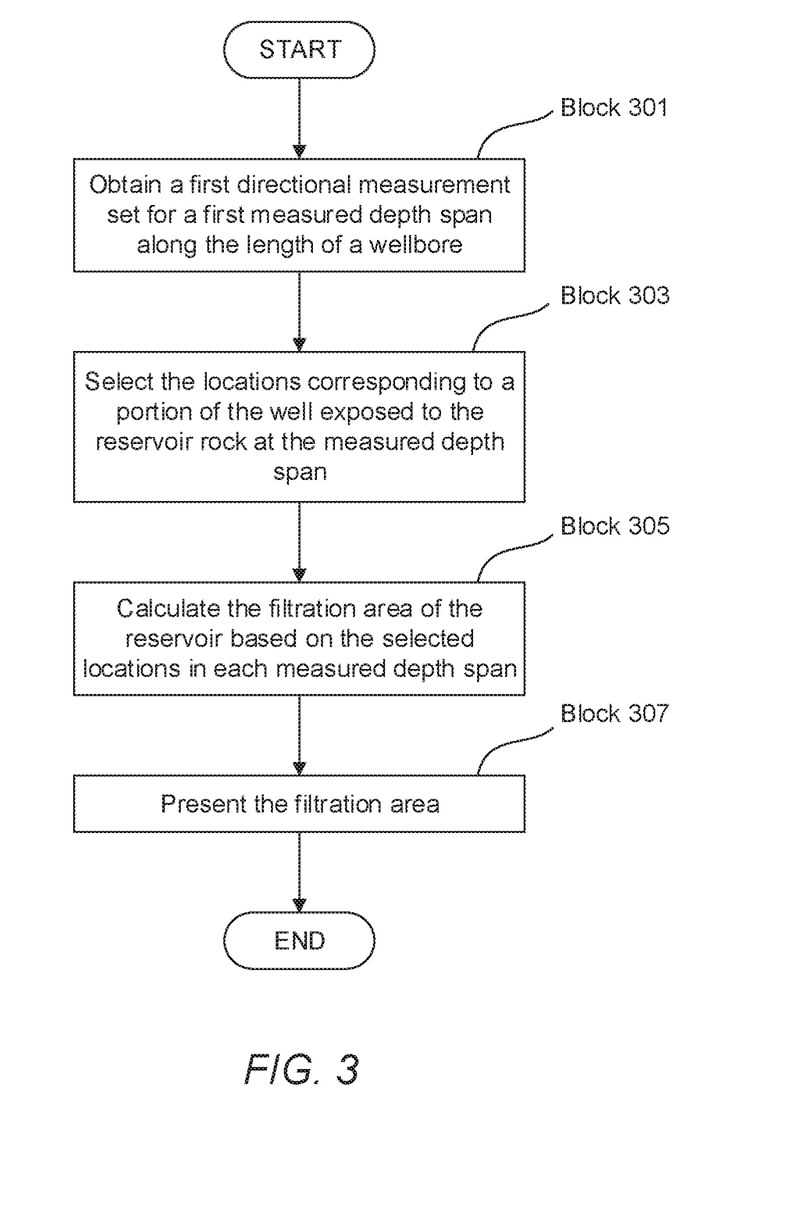

FIG. 3 depicts a flowchart of an example method in accordance with one or more embodiments. For example, the method depicted in FIG. 3 may be practiced using the E&P computer system (118) described in reference to FIGS. 1 and 2 above. In one or more embodiments, one or more of the elements shown in FIG. 3 may be omitted, repeated, and/or performed in a different order. Accordingly, one or more embodiments should not be considered limited to the specific arrangements of elements shown in FIG. 3.

In Block 301, a first directional measurement set is obtained for a first measured depth interval along the length of a wellbore. In one or more embodiments, the directional measurement is from a logging tool that has the capability to obtain measurements for multiple positions around the wellbore. For example, MWD technologies allow to measure bulk density around the wellbore because the tool is continuously rotating while taking measurements. In one or more embodiments, the depth interval may be specified by the user or may be derived from the rate of advancement of the logging tool during drilling of the well. For example, the depth interval may be equal to the length advanced by the drill string during a defined number of rotations of the drill bit.

In Block 303, a set of locations are selected corresponding to a portion of the well exposed to the reservoir rock at the measured depth interval. In one or more embodiments, the measurements from the directional measurement set are filtered based on the value of the measurement. In one or more embodiments, a threshold is defined to serve as a filtering criteria, whereby the locations with measurements exceeding the threshold criteria being added to the selection. In one or more embodiments, the threshold is defined based on the results of sample rock analysis, the threshold is determined as an extreme value for a reservoir attribute. For example a value of bulk density may be selected as a threshold, a measurement being considered from a reservoir formation if the measured bulk density is below the threshold.

In Block 305, the filtration area of the reservoir is calculated based on the selected locations in each measured depth interval. In one or more embodiments, the selected reservoir locations are summed and the total reservoir filtration area is obtained.

In Block 307, the filtration area is presented. In one or more embodiments, the filtration area is presented in a display visualization. In one or more embodiments, the filtration area may be presented as an image strip along the wellbore display. In one or more embodiments, the image strip is rendered by using the trajectory and the directional measurements obtained. In one or more embodiments, each measurement may be represented by a pixel in the image strip, each pixels being mapped to a color based on whether the measurement belong to the filtration area location or the measurement was filtered out. In one or more embodiments, a field operation may be adjusted based on the filtration area. For example, a formation flow test may be adjusted based on the extent and location of the filtration area.

In one or more embodiments, the reservoir production from an oilfield well is evaluated using azimuthal measurements while drilling (MWD) such as Bulk Density Image and Borehole Radius Array. In particular, the measured data analysis workflow calculates well total filtration area and azimuthal reservoir net-to-gross coefficient. If a well is drilled along the border of a reservoir layer and a non-reservoir layer or cross the border for a long distance, the filtration area of the reservoir on the surface of the wellbore is reduced. The present technology removes the production estimation error generated by the assumption that well is producing from entire circumference of the wellbore when the wellbore is partially in a pay zone. In one or more embodiments, by taking into account the reduced filtration area, the production calculation and well completion design is clarified.

Figure 41:
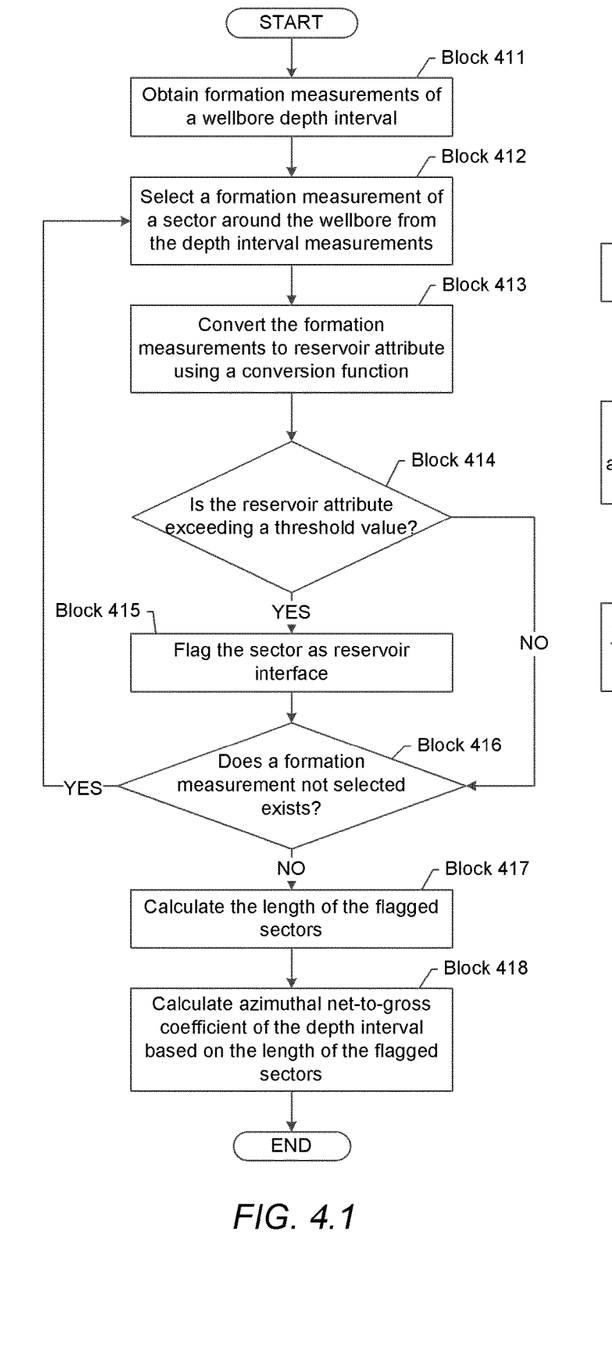
Figure 42:
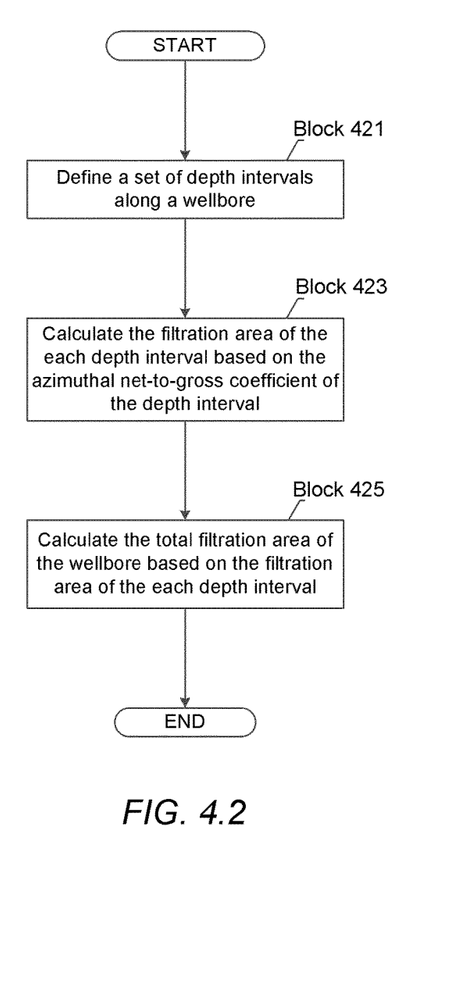

FIGS. 4.1 and 4.2 show flowcharts in accordance with one or more embodiments. While the various blocks in these flowcharts are presented and described sequentially, one of ordinary skill will appreciate that at least some of the blocks may be executed in different orders, may be combined or omitted, and at least some of the blocks may be executed in parallel. Furthermore, the actions in the blocks may be performed actively or passively. For example, some actions may be performed using polling or be interrupt driven in accordance with one or more embodiments. By way of an example, determination blocks may not involve a processor to process an instruction unless an interrupt is received to signify that condition exists in accordance with one or more embodiments. As another example, determination blocks may be performed by performing a test, such as checking a data value to test whether the value is consistent with the tested condition in accordance with one or more embodiments.

FIG. 4.1 shows a general flowchart to determine the azimuthal net-to-gross coefficient of one depth interval based on formation measurements.

In Block 411, a set of formation measurements is obtained for a wellbore depth interval. In one or more embodiments, the formation measurements may come from the MWD tools (also known as logging while drilling (LWD) tools). For example, the MWD tools may log a bulk density image using a Gamma-Gamma detector. Radioactive Gamma-Gamma logging is an industry standard method for bulk density evaluation. In one or more embodiments, a radioactive source of the logging tool emits gamma quants with specific energy to formation. The gamma rays interact with formation atoms and scatter their energy. Returned gamma quants energy spectrum is captured by a detector on the logging tool. Amount for returned gamma quants within specific energy window will relate with formation electron density. Detectors are placed to one side of the logging tool as close as possible to well boundary. In one or more embodiments, the measurements record the gamma ray energy measurement along with depth and position of the measurement around the wellbore. The MWD technology involves a permanent rotation of the measurement (logging) tool, the rotation allows measuring the bulk density around the wellbore. Further, the measurements may be assembled into an image representation of the wellbore formation called bulk density image.

In Block 412, a formation measurement of a sector around the wellbore is selected from the depth interval measurements. In one or more embodiments, the MWD bulk density image measurements around the wellbore are associated each with a sector of the wellbore. For example, most of logging while drilling tools provide 16 sectors (22.5 degrees for each sector). Bulk density is measured for each sector separately and a sector is selected according to one or more embodiments.

In Block 413, the formation measurements are converted to reservoir attribute using a conversion function. In one or more embodiments, conversion function is defined between the measured bulk density and formation porosity:

$$\varphi = \frac{\rho_{ma} - \rho_{bulk}}{\rho_{ma} - \rho_f} \qquad \text{EQ. 1}$$

In the EQ. 1, $\Phi$ represents the formation porosity, $\rho_{ma}$, represents the formation matrix density, $\rho_{bulk}$ represents the formation bulk density (measured by logging tool), and $\rho_f$ represents the formation fluid density. The relationship presented in EQ.1 is obtained in the lab using multiple core samples analysis. In one or more embodiments, a core is a rock specimen of the subsurface formation that preserves the structure and content of the portion of the subsurface formation from where the core sample was extracted. Core studies test the values of the core density and measure the fluid hydrocarbon flow capability through the core in order to determine a relationship between the density measured by the logging tool and the ability of the fluid hydrocarbon to flow through sample, the flow ability defining the reservoir. In one or more embodiments, a limit may be found during the testing process that determines a density threshold for a rock formation to be defined as a reservoir.

In Block 414, the reservoir attribute value is tested against the threshold. In one or more embodiments, based on lab studies on porosity and permeability of reservoir rocks, a reservoir attribute threshold is defined in order to distinguish between a reservoir and a non-reservoir formation. For example a porosity value of the formation rock in the selected sector of 20% may be defined as the minimum porosity for the sector to be flagged as a reservoir.

In Block 415, if the reservoir attribute satisfies the threshold value (for example the attribute value is greater or equal to the threshold value), the sector is flagged as reservoir interface. After the sectors from the measurement set are evaluated the non-reservoirs sectors are filtered out so further analysis is based on reservoir sectors. In one or more embodiments, a quality check is performed for each sector to define whether the case of a formation measurement is accurate or not accurate. A source of error is the standoff (gap) between the tool and wellbore wall. As each tool has different specification of standoff capability, the sector is removed from further analysis if the measured standoff is bigger than tool specification.

In Block 416, if the reservoir attribute does not satisfy the threshold value, the formation measurements are searched to determine whether a measurement exists that has not been selected. If such a measurement exists, the measurement is selected in block (412).

In Block 417, if such a measurement does not exist, the length of the flagged sectors is calculated. In one or more embodiments, to calculate the length a sector another formation measurement is used, the Borehole Radius Array. The Borehole Radius Array measurements provide wellbore radius in the same sector with bulk density measurement. In one or more embodiments, the Borehole Radius Array is used to calculate length of wellbore arc for each image sector. Each sector has different length of arc. The length of arc for each sector depends on wellbore cross section profile and on the logging tool decentering. EQ. 2 is used to calculate length of arc for a sector:

$$a_i = \frac{\alpha}{360} 2\pi r_i \qquad \text{EQ. 2}$$

In the EQ. 2, $a_i$ represents the length of arc of single sector of bulk density image, $h_t$ represents the measurement of wellbore radius (done by the tool), and a represents the sector angle, the sector angle being defined as a fixed value for the tool. For 16 sector bulk density image tool the fixed value is 360/16=22.5 deg.

The total length of well circumference is calculated from EQ. 3:

$$L = \rho_{i=0}^{n}(a_i) \qquad \text{EQ. 3}$$

In the EQ. 3, L represents the total length of wellbore circumference, and $a_i$ represents the approximated length of arc for an image sector.

The length of arc of well circumference exposed to reservoir is calculated from EQ. 4:

$$a = \rho_{k=0}^{n}(a_k), \rho_k < \rho_{critical\_core} \qquad \text{EQ. 4}$$

In the EQ. 4, a represents the length of arc of well circumference exposed to reservoir, $a_k$ represents the length of arc of sector where bulk density is less than critical value defined from core studies, $\rho_k$ represents the measured bulk density for the sector, $\rho_{critical\_core}$ represents the threshold obtained from core studies, and n represents the number of sectors the logging tool is able to provide.

In Block 418, the azimuthal net-to-gross coefficient of the depth interval is calculated based on the length of the flagged sectors. In one or more embodiments, the coefficient is equal to ratio of the wellbore circumference exposed to reservoir formation:

$$NTG_{az} = \frac{a}{L} \qquad \text{EQ. 5}$$

In the EQ. 5, $NTG_{az}$ represents the azimuthal reservoir net-to-gross coefficient, a represents the length of arc of well circumference exposed to reservoir, and L represents the total length of wellbore circumference.

FIG. 4.2 shows a general flowchart to calculate the total filtration area of the wellbore.

In Block 421, a set of depth intervals are defined along a wellbore. In one or more embodiments, the entire length of the wellbore is divided in multiple depth intervals of equal length. In one or more embodiments, the depth may be the MD. Depth values are obtained from the logging tool or may be obtained from other equipment of the oilfield. For example depth measurements may be obtained from the length of drilling pipe going in the well during the drilling of the well, the depth measurements being referenced to a fixed point of the drilling equipment. In one or more embodiments, the wellbore length may be divided in equal or unequal depth intervals based on user input. In one or more embodiments, the depth intervals may be defined for a selection of wellbore length known to host fluid hydrocarbons (pay zone) and exclude intervals that do not correspond to pay zones. In this case, further processing of the filtration area calculation considers the depth intervals in the pay zone.

In Block 423, the filtration area of the each depth interval is calculated based on the azimuthal net-to-gross coefficient of the depth interval. In one or more embodiments, the filtration area is equal to surface area of the wellbore wall within the depth interval multiplied by azimuthal net-to-gross coefficient:

$$S_j = l*L*NTG_{az} = l*a \qquad \text{EQ. 6}$$

In EQ. 6, $S_j$ represents the filtration area for a single depth interval, l represents the depth interval, L represents the total length of wellbore circumference, $NTG_{az}$ represents the azimuthal reservoir net to gross coefficient, and a represents the length of arc of wellbore circumference exposed to reservoir. The length of cylinder is equal to the depth interval length.

In Block 425, the total filtration area of the wellbore is calculated based on the filtration area of the each depth interval. In one or more embodiments, the total filtration area is obtained by summation of filtration areas from each depth interval along the trajectory of a wellbore:

$$S = \Sigma_{j=0}^{m}(S_j) \qquad \text{EQ. 7}$$

In EQ. 7, S represents the total well fluid filtration area, m represents the total number of depth intervals, and $S_j$ represents the filtration area for a single depth interval. The total filtration area is equal to the total well fluid filtration area for the well.

FIGS. 5.1, 5.2, 6, 7 and 8 show examples in accordance with one or more embodiments. The examples are not intended to limit embodiments described herein.

Figure 51:
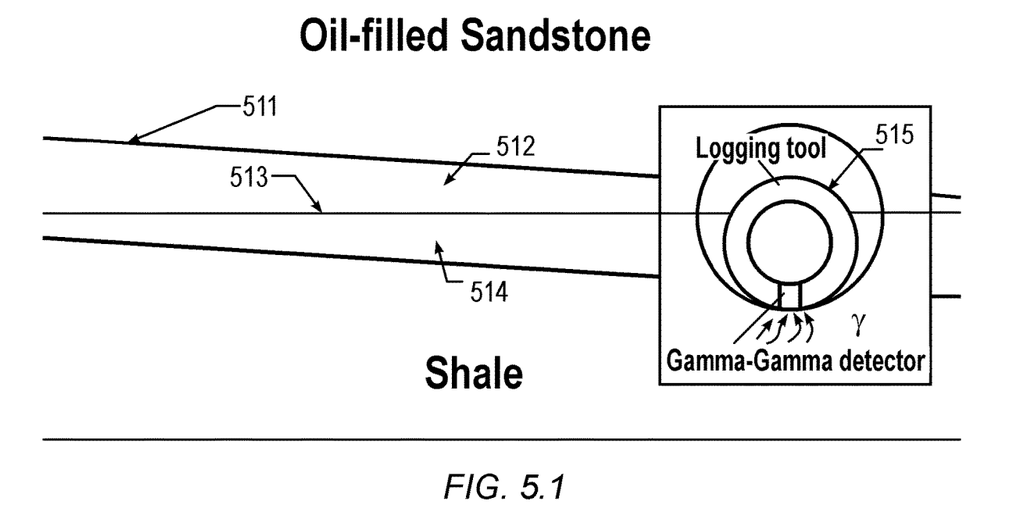

FIG. 5.1 shows a wellbore trajectory (511) that penetrates the boundary (513) between a reservoir formation (512) and a non-reservoir formation (514) along with an inset picture of the wellbore section with the logging tool (515) positioned to measure the formation around the wellbore. As shown, because of the inclination angle, the wellbore transitions for a large MD interval between the reservoir and non-reservoir rock. Because of the size of the transition interval, in one or more embodiments, the logging tool may measure the bulk density of the rock formation around the wellbore.

Figure 52:
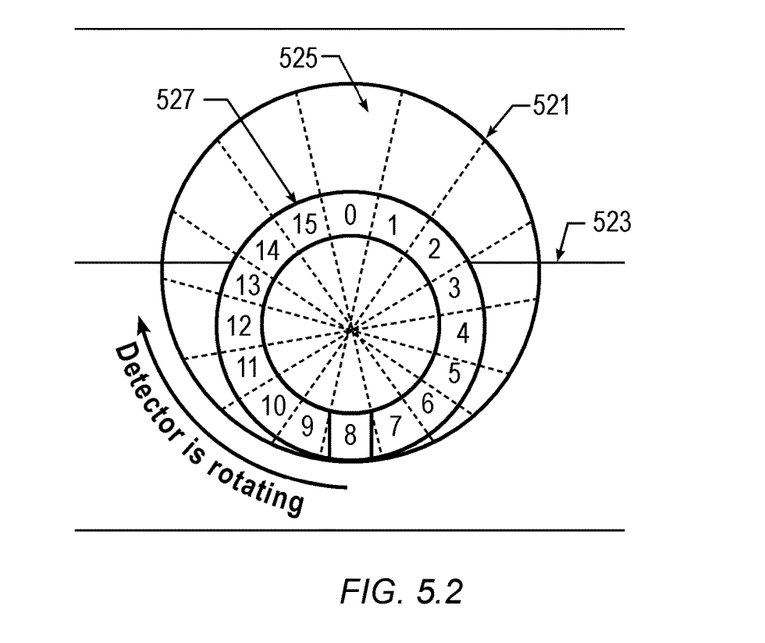

FIG. 5.2 shows a wellbore section (521) of a well that penetrates the boundary (523) between a reservoir formation and a non-reservoir formation with the position sectors (525) around the wellbore. The logging tool (527) is rotating in the direction indicated by the arrow and subsequently measure one or more rock properties. In one or more embodiments, a directional parameter is also recorded by the logging tool. The directional parameter defines the position of the measurement around the wellbore section. In one or more embodiments, each directional measurement is assigned to a position sector (525).

Figure 6:
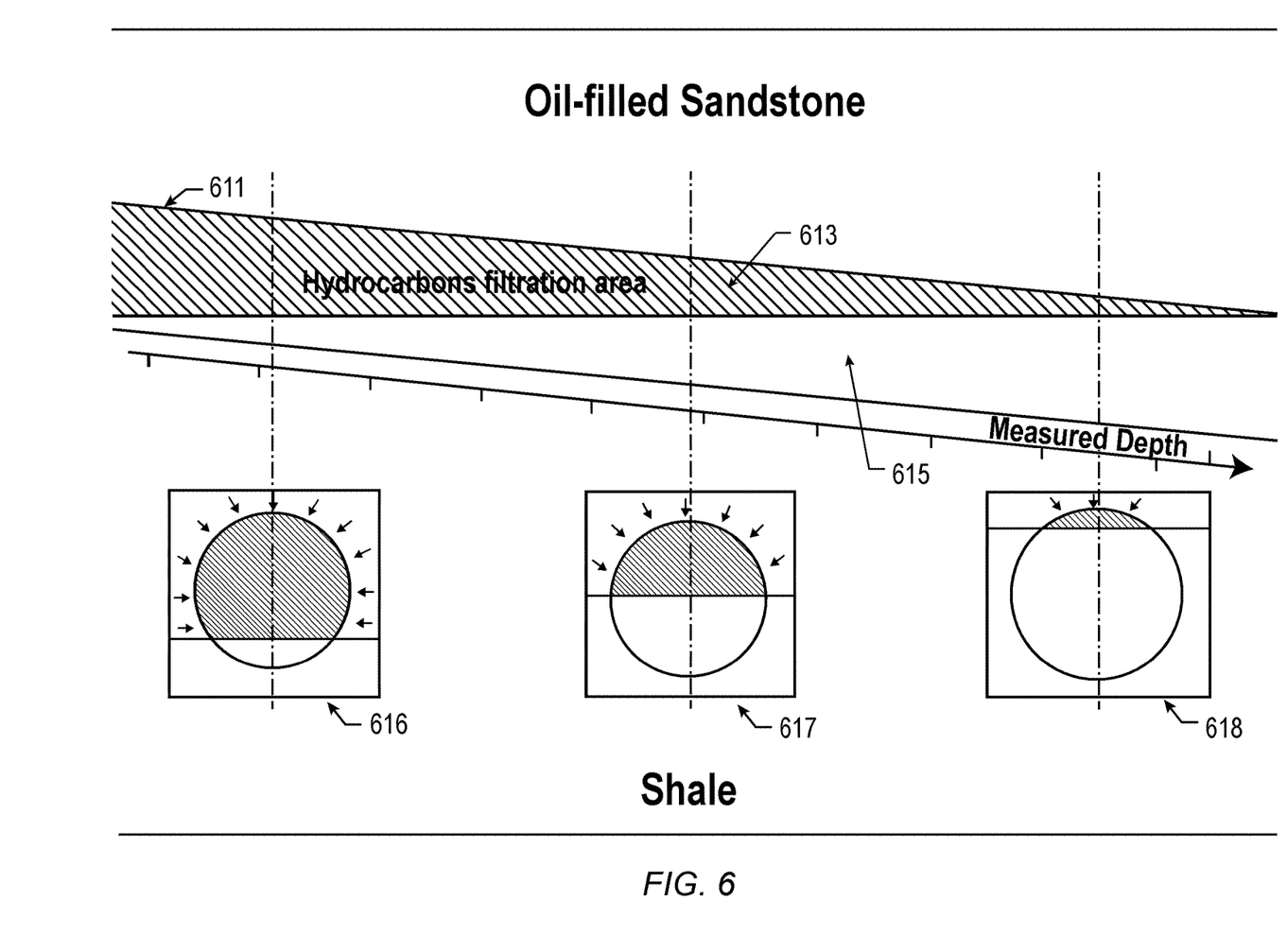

FIG. 6 shows the wellbore of FIG. 5.1, for example, in longitudinal section with three wellbore sections sampled at three depths along the trajectory of the wellbore (611). The wellbore penetrates a boundary between a reservoir formation and a non-reservoir formation at a sub-parallel dip angle. Because the wellbore is drilled almost parallel to the formations crossed the wellbore has a variable exposure to the reservoir with depth. The filtration area (613) is therefore reduced as the wellbore progress in depth and in the same time the non-reservoir area exposure (615) is expanding as the wellbore progress in depth. As shown by a series of transversal sections of the wellbore, the variation of the filtration area is visualized in this example by three sections. In one or more embodiments, the three sections may correspond to three depth intervals measurement sets. The first section (616) displays the largest coverage of the filtration area around the wellbore among the three sections. As the wellbore progress in depth, less filtration area is exposed around the wellbore, the last section (618) being almost entirely bounded by non-reservoir rock formation. The section in the middle (617) is bounded in equal proportion by reservoir rock formation and non-reservoir rock formation.

Figure 7:
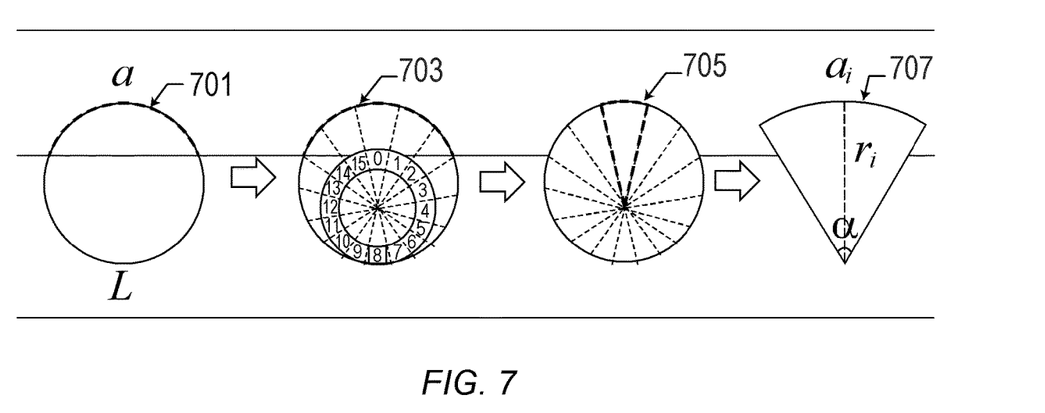

FIG. 7 shows depiction of the azimuthal net-to-gross coefficient determination process. In one or more embodiments, using LWD bulk density measurements a wellbore image strip view may be created at each depth interval. The image strip displays a section through the wellbore (701) with the values of the bulk density measurements projected on a circle representing the wellbore section. In one or more embodiments, the image strip may be composed of pixels, each pixel representing the value of measurement in one location sector. Further, by analyzing the values of the pixels, a reservoir rock contact zone may be defined from comparing the measurements to a bulk density threshold obtained from rock samples studies. As a result, non-reservoirs pixels of image strip are filtered out so further analysis is based on reservoir pixels. The wellbore section is divided in a multitude of sectors (703), and the sectors that contain the reservoir pixels (705) are flagged for further calculations. Further, the length of arc of each sector (707) is calculated based on the sector parameters.

Figure 8:
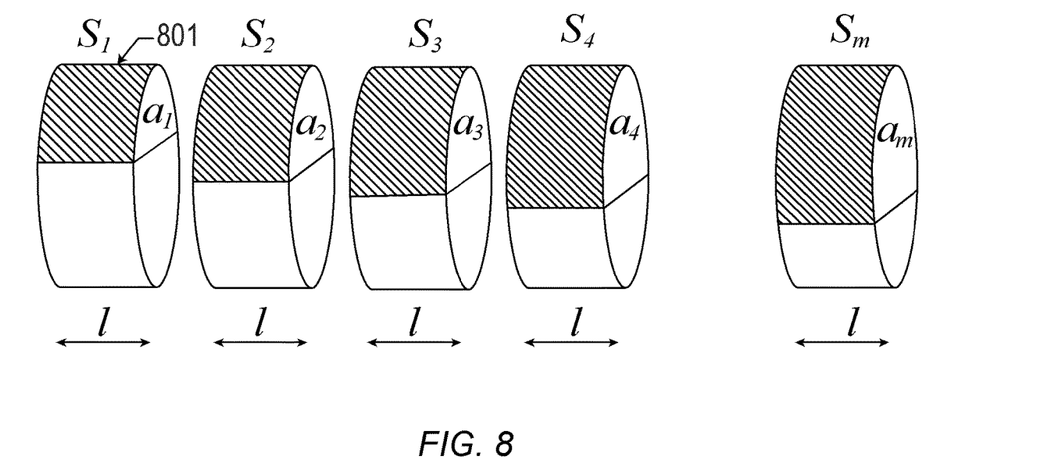

FIG. 8 shows depiction of the total filtration area of the wellbore determination process. In one or more embodiments, the filtration area of each depth interval (801) are added together to determine the total filtration area of the well.

Embodiments may be implemented on a computing system. Any combination of mobile, desktop, server, router, switch, embedded device, or other types of hardware may be used. For example, as shown in FIG. 9.1, the E&P computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The E&P computing system (900) may also include one or more input devices (910), such as a touchscreen, keyboard, mouse, microphone, touchpad, electronic pen, or any other type of input device.

The communication interface (912) may include an integrated circuit for connecting the E&P computing system (900) to a network (not shown) (e.g., a local area network (LAN), a wide area network (WAN) such as the Internet, mobile network, or any other type of network) and/or to another device, such as another computing device.

Further, the E&P computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The E&P computing system (900) in FIG. 9.1 may be connected to or be a part of a network. For example, as shown in FIG. 9.2, the network (920) may include multiple nodes (e.g., node X (922), node Y (924)). Each node may correspond to a computing system, such as the computing system shown in FIG. 9.1, or a group of nodes combined may correspond to the computing system shown in FIG. 9.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned E&P computing system (900) may be located at a remote location and connected to the other elements over a network.

Although not shown in FIG. 9.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9.1. Further, the client device (926) may include and/or perform at least a portion of one or more embodiments.

The computing system or group of computing systems described in FIGS. 9.1 and 9.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a GUI on the user device. Data may be submitted via the GUI by a user selecting one or more GUI widgets or inserting text and other data into GUI widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 9.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9.1, while performing one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 9.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 9.1 and the nodes and/or client device in FIG. 9.2. Other functions may be performed using one or more embodiments.

While a limited number of embodiments are described, those skilled in the art, having benefit of this disclosure, will appreciate that other embodiments can be devised which do not depart from the scope as disclosed herein. Accordingly, the scope should be limited by the attached claims.

What is claimed is:

1. A method to define a filtration area of a reservoir around a wellbore comprising:
obtaining a directional measurement set for a measured depth interval along a length of the wellbore;
selecting, based at least in part on the directional measurement set, a plurality of locations corresponding to a portion of the wellbore exposed to reservoir rock at the measured depth interval;
calculating the filtration area of the reservoir based at least in part on the selected locations in the measured depth interval; and
presenting the filtration area as part of an image display of the wellbore, wherein the presentation includes:
displaying a plurality of pixels representing values of the directional measurement set at locations along the wellbore, wherein one or more of the plurality of pixels represent the selected locations that contribute to the filtration area.

2. The method of claim 1, wherein the depth interval is defined based on directional measurement vertical resolution.

3. The method of claim 1, wherein directional measurements of the directional measurement set are defined at least partially based on a perspective of a measuring tool around the wellbore.

4. The method of claim 1, wherein directional measurements of the directional measurement set represent an attribute able to at least partially distinguish the reservoir rock from non-reservoir rock.

5. The method of claim 1, wherein the selection of the locations is based on a threshold value for a measured attribute represented by directional measurements of the directional measurement set.

6. The method of claim 1, wherein the filtration area is calculated based at least in part on wellbore radius.

7. The method of claim 1, further comprising performing a field operation based on the calculated reservoir filtration area.

8. The method of claim 1, further comprising:
conducting further analysis on locations associated with reservoir pixels.

9. The method of claim 1, wherein selecting, based at least in part on the directional measurement set, the plurality of locations comprises:
converting at least some measured values of the directional measurement set to reservoir attribute values for the locations;
comparing the formation reservoir attribute values to a predetermined threshold value; and
selecting the locations associated with formation reservoir attribute values that are equal to or greater than the threshold value.

10. A system for defining a filtration area of a reservoir around a wellbore comprising:
a computer processor; and
memory comprising instructions that, when executed by the computer processor, cause the computer processor to:
obtain a directional measurement set for a measured depth interval along a length of the wellbore;
select, based on the directional measurement set, a plurality of locations corresponding to a portion of the wellbore exposed to reservoir rock at the measured depth interval;
calculate the filtration area of the reservoir based on the selected locations in the measured depth interval; and
present the filtration area as part of an image display of the wellbore, wherein presenting includes displaying a plurality of pixels representing values of the directional measurement set at locations along the wellbore, wherein one or more of the plurality of pixels represent the selected locations that contribute to the filtration area.

11. The system of claim 10, wherein the depth interval is defined based at least in part on a directional measurement vertical resolution.

12. The system of claim 10, wherein directional measurements of the directional measurement set are defined based at least in part on a perspective of a measuring tool around the wellbore.

13. The system of claim 10, wherein directional measurements of the directional measurement set represent an attribute able to at least partially distinguish the reservoir rock from non-reservoir rock.

14. The system of claim 10, wherein the selection of locations around the wellbore is based on a threshold value for a measured attribute represented by directional measurements of the directional measurement set.

15. The system of claim 10, wherein the filtration area of the selected locations is calculated based at least in part on wellbore radius.

16. The system of claim 10, wherein the instructions, when executed, further cause the processor to perform a field operation based at least in part on the calculated reservoir filtration area.

17. A non-transitory computer readable medium comprising computer readable program code for defining a filtration area of a reservoir around a wellbore, the computer readable program code for:
obtaining a directional measurement set for a measured depth interval along a length of the wellbore;
selecting, based on the directional measurement set, a plurality of locations corresponding to a portion of the wellbore exposed to reservoir rock at the measured depth interval;
calculating the filtration area of the reservoir based on the selected locations in the measured depth interval; and
presenting the filtration area as part of an image display of the wellbore, wherein the presentation includes:
displaying a plurality of pixels representing values of the directional measurement set at locations along the wellbore, wherein one or more of the plurality of pixels represent the selected locations that contribute to the filtration area.

18. The non-transitory computer readable medium of claim 17, wherein the depth interval is defined based at least in part on a directional measurement vertical resolution.

19. The non-transitory computer readable medium of claim 17, wherein directional measurements of the directional measurement set are defined based at least in part on a perspective of a measuring tool around the wellbore.

20. The non-transitory computer readable medium of claim 17, wherein directional measurements of the directional measurement set represent an attribute able to at least partially distinguish the reservoir rock from non-reservoir rock.

21. The non-transitory computer readable medium of claim 17, wherein the selection of locations around the wellbore within the directional measurement set is based at least in part on a threshold value for measured attribute represented by directional measurements of the directional measurement set.

22. The non-transitory computer readable medium of claim 17, wherein the filtration area of the selected locations is calculated based at least in part on wellbore radius.

* * * * *